United States Patent
Yagishita et al.

(10) Patent No.: US 7,155,059 B2
(45) Date of Patent: Dec. 26, 2006

(54) COLOR IMAGE PROCESSING APPARATUS AND COLOR IMAGE PROCESSING METHOD

(75) Inventors: Takahiro Yagishita, Kanagawa (JP); Satoshi Ouchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 546 days.

(21) Appl. No.: 10/737,807

(22) Filed: Dec. 18, 2003

(65) Prior Publication Data

US 2004/0130738 A1 Jul. 8, 2004

Related U.S. Application Data

(60) Continuation of application No. 10/270,199, filed on Oct. 15, 2002, now Pat. No. 6,704,444, which is a division of application No. 09/282,456, filed on Mar. 31, 1999, now Pat. No. 6,480,623.

(30) Foreign Application Priority Data

Apr. 8, 1998 (JP) .................................. 10-096145

(51) Int. Cl.
*G06K 9/00* (2006.01)
(52) U.S. Cl. ...................................... 382/167; 382/166
(58) Field of Classification Search ........ 382/166–167, 382/176, 263, 289, 162, 163, 232–233, 240; 358/1.9, 1.2, 518–523, 504, 539, 443–448, 358/515, 296, 426.01–426.16; 710/72; 345/443, 501, 613

See application file for complete search history.

(56) References Cited

U.S. PATENT DOCUMENTS

| | | | |
|---|---|---|---|
| 5,249,061 A | 9/1993 | Nagashima et al. | 358/296 |
| 5,386,509 A | 1/1995 | Suzuki et al. | 345/501 |
| 5,406,393 A | 4/1995 | Ueno | 358/504 |
| 5,493,415 A | 2/1996 | Mita et al. | 358/444 |
| 5,555,360 A | 9/1996 | Kumazaki et al. | 345/443 |
| 5,617,485 A | 4/1997 | Ohuchi et al. | 382/176 |
| 5,805,933 A | 9/1998 | Takahashi | 710/72 |
| 5,825,937 A | 10/1998 | Ohuchi et al. | 382/263 |
| 5,850,298 A | 12/1998 | Narahara et al. | 358/518 |
| 5,880,856 A | 3/1999 | Ferriere | |
| 5,930,386 A | 7/1999 | Saito | 382/166 |

(Continued)

FOREIGN PATENT DOCUMENTS

JP 5-145751 8/1993

(Continued)

OTHER PUBLICATIONS

U.S. Appl. No. 10/737,807, filed Dec. 18, 2003, Yagishita et al.

(Continued)

*Primary Examiner*—Ishrat Sherali
(74) *Attorney, Agent, or Firm*—Oblon, Spivak, McClelland, Maier & Neustadt, P.C.

(57) ABSTRACT

The color image processing apparatus comprises; a compressing/extending section for compressing the BRG input signals, storing the compressed signals in the page memory, restoring the compressed BGR input signals, and outputting the restored signals; a color converting section for receiving the restored signals and converting the restored signals to YMC signals; a ink block generating and ground removing section for generating a K (black) signal according to the YMC signals and removing the ground; and an area separation type of filter for grouping a plurality of pixels in to blocks, identifying the type of image of each block, and generating an area separation signal for an intermediate tone, a black character, or a colored character.

9 Claims, 3 Drawing Sheets

U.S. PATENT DOCUMENTS 6,173,088 B1    1/2001    Koh et al. .................. 382/289
6,993,181 B1 *    1/2006    Tabata et al. ............... 382/166

FOREIGN PATENT DOCUMENTS

JP      8-242379      9/1996
JP      09-312776      12/1997

OTHER PUBLICATIONS

U.S. Appl. No. 10/986,781, filed Nov. 15, 2004, Matsuura et al.
U.S. Appl. No. 10/737,807, filed Dec. 18, 2003, Yagishita et al.
U.S. Appl. No. 10/986,781, filed Nov. 15, 2004, Matsuura et al.

* cited by examiner

COLOR IMAGE PROCESSING APPARATUS AND COLOR IMAGE PROCESSING METHOD This application is based upon and claims the benefit of priority from the prior Japanese Patent Application No. 10-096,145, filed Apr. 8, 1998, and from U.S. patent application Ser. No. 10/270,199, filed Oct. 15, 2002 U.S. Pat. No. 6,704,444, and Ser. No. 09/282,456, filed Mar. 31, 1999 U.S. Pat. No. 6,480,623, the entire contents of which are incorporated herein by reference.

FIELD OF THE INVENTION

The present invention relates to a color image processing apparatus such as a full-color digital copying machine or a full-color digital printer/full-color digital facsimile which can compress image data and process digital color images and color image processing method thereof.

BACKGROUND OF THE INVENTION

In recent years, efforts are being made for the development of the color laser recording technology based on an electronic photograph system especially in the field of digital full-color electronic photograph system and there are strong needs for higher image quality. To satisfy the needs for higher image quality digital image processing is executed to obtain an image faithful to the original image, and in some cases excellent reproducibility is realized.

For instance, a color copying machine having one photosensitive drum produces data for 4 colors of Y (yellow), M (magenta), C (cyan), and K (Black) from document data read with a scanner, successively prepares blocks for 4 colors, and produce a full-color image by superimposing the blocks successively. In this case, color adjustment is executed for color separation signals for B (Blue), G (Green), and R (Red) produced by optically reading a document with a color CCD line sensor and the signals are then converted to the Y, M, and C signals. Then preparation of a ink block (K) and removal of the ground are executed, removal of moiré and mesh dots and edge emphasis are executed, and, the charged photosensitive drum is exposed to (optically written by) a laser beam modulated according to data subjected to gradation processing after gamma correction to form an image for each color.

However, with an image forming apparatus not having a memory adequate for storing data for one page therein, scanning (for optically reading a document) must be executed 4 times, and area separation is executed each time. However, a result of area separation executed 4 times for Y, M, C, and K is not always identical due to vibration or noises, which may sometimes disadvantageously cause trouble relating to image quality such as intermittent black characters (partial lack thereof).

As the technology for solving the problem as described above, for instance, Japanese Patent Laid-Open Publication No. HEI 5-145751 discloses a "area recognition signal processing circuit for a color image processing apparatus". In this circuit, by providing a page memory of one page for storing data concerning a result of area separation obtained in the first block, a difference between results of printing 4 black copies is eliminated to solve the problem as described above.

On the contrary, in the image forming apparatus having a page memory for storing data for one page therein, image data is stored simultaneously when a first block is printed, and blocks subsequent to the second block are printed by reading the data from the page memory. Further, by providing a page memory in place of a memory for storing therein a result of area separation, a result of area separation is equalized for all blocks to solve the problem described above.

The image forming apparatus having a page memory for storing data for one page has the merit that it can rotate or edit an image, and as scanning is required to be executed only once for a document, power consumption and generation of noise during operation can be suppressed and the printing speed is higher.

In the conventional type of technology as disclosed in Japanese Patent Laid-Open Publication No. HEI 5-145751, however, as a separate memory for storing a result of area separation is required the cost of the apparatus as a whole increases. In addition, since a page memory is not provided therein, the merits as described above disappear.

Further, in the image forming apparatus having a page memory, a memory capacity for storing data for one page is very large, which also results in cost increase. For instance, when the resolution is 600 dpi, the graduation is 24 bit/pixel, and the size of the paper is A3, a memory capacity of 256 mega bytes is required. One method of cutting down the required memory capacity is the application of the technology of data compression. However, if data read out from the page memory is not the same as the one used when the first block is printed, a result of area separation is not identical for all blocks, and in such a case, reverse compression for restoring the data to the original one is required. Namely, although image quality is improved by means of reverse compression, the compression ratio can not be made higher as compared to that in non-reverse compression, so that the above-described object of reduction of a required memory capacity can not be achieved.

SUMMARY OF THE INVENTION

It is an object of the present invention to provide a color image processing apparatus capable of suppressing image degradation and having a low cost and high speed page memory and color image processing method thereof.

With the present invention, a area separating unit executes processing according to the restored signals (B', G', R') for all the blocks of Y, M, C, and K, and hence a difference in a result of area separation which would otherwise easily be generated can be suppressed.

With the present invention, by executing image processing without compressing or extending a K (black) block which has a largest influence on the image quality, image degradation due to compression or extending is suppressed, and at the same time, by using restored signals after compression for YMC blocks which have a less influencing as compared to the K block copy, the compression ratio is made higher so that the required page memory can be reduced.

With the present invention, when the area separating unit generates an area separation signal, the area separating unit counts runs of Y, M, and C signals each exceeding a specified value for each pixel, and measures a run-length for each block according to the count. As an inter-character space becomes longer as compared to the pitch of the dots in the character area while the block length becomes shorter, so that a character area can easily be separated from a meshed area.

With the present invention, a compressing/extending unit subjects the BGR input signals to linear conversion so as to convert the signals to color space signals Y, I, Q each for a color difference, and then subjects the signals to sub-band conversion, so that a statistical power of an image is concentrated to the brightness signal Y and entropy can be reduced.

When the present invention, when compressed data is extended, sub-band reverse conversion is executed using each quantization coefficient to obtain Y', I', and Q' signals, and the compressed data is expressed by reversibly converting the B', G', and R' signals.

Other objects and features of this invention will become apparent from the following description with reference to the accompanying drawings.

DESCRIPTION OF THE PREFERRED EMBODIMENTS

Detailed description is made for a color image processing apparatus and color image processing method thereof according to the present invention with reference to the attached drawings.

Figure 1:
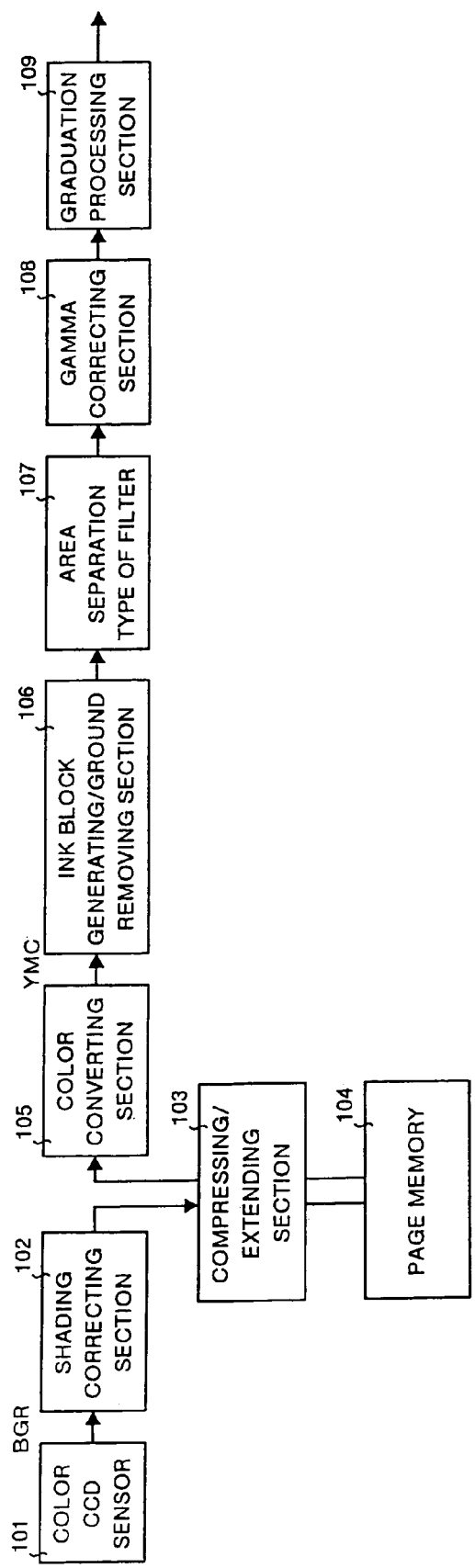
FIG. 1 is a block diagram showing system con figuration of a color image processing apparatus according to Embodiment 1 of the present invention.

FIG. 1 is a block diagram showing system configuration of a color image processing apparatus according to Embodiment 1 of the present invention. In this figure, designated at the reference numeral 101 is a color CCD line sensor for forming an image by converting the light reflected from a document converged with a document illuminating system (not shown) and an image-forming optical system (not shown) and outputting the reflected light as analog signals for blue (B), green (G), and red (Red) (BGR signals). Designated at 102 is a shading correcting circuit for correcting image distortion due to non-uniformity in the color CCD line sensor as well as due to non-uniformity in light from a light source in the document illuminating system.

Designated at 103 is a compressing/extending section as a compressing/extending unit for subjecting inputted B, G, R image signals to linear conversion for obtaining color space signals each for bright color difference and for compressing or extending the inputted image signals as described afterwards. Designated at 104 is a page memory for storing the image signals compressed by the compressing/extending section 103. Designated at 105 is a color converting section as a color converting unit for executing such processing as specified color conversion, painting, trimming, and masking according to specification by an operating section (not shown), converting reflection factor-voltage linear signals (BGR) to density-voltage linear signals for Y (yellow), M (Magenta), and C (Cyan), and outputting the converted signals. Designated at 106 is a ink block generating/ground removing section as a ink block generating/ground removing unit for separating (for ground removal: UCR processing) a gray component in each of the YMC signals to replace each signal with a ink signal (K: Black) and generating signals for 4 colors of Y, M, C, and K. Designated at 107 is a area separation type of filter 107 which groups a plurality of pixels into several blocks, determines to which of a pattern, background, and characters each block indicates, and also as to whether the block is a colored image or a monochrome image, and the blocks are synthesized to generate an area separation signal for an intermediate tone, a black character, or a colored character. Designated at 108 is a gamma correcting section for correcting gamma characteristics. Finally, designated at 109 is a graduation processing section for executing specified graduation processing.

The color image processing apparatus having the configuration as described above generates data for 4 colors of Y (yellow), M (magenta), C (Cyan), and K (black) from the read document data, and reproduces a color image by successively preparing blocks for 4 colors and superimposing the 4 color blocks. Detailed description is made for operations of the system.

The B, G, and R signals read with the color CCD line sensor 101 are sent to the shading correcting section 102. In this shading correcting section 102, the B, G, R signals each amplified to an appropriate level and also having been subjected to A/D conversion are received, processing is executed for correcting noise in the signal, namely image distortion due to non-uniformity of sensitivity of the color CCD line sensor 101 as well as due to non-uniformity in light from a light source in the document illuminating system, and then supplies the image signal to the compressing/extending section 103. In the compressing/extending section 103, the B, G, R signals are successively compressed and the compressed signals are stored in the page memory 104. Simultaneously when the signals are stored in the page memory, the compressed image signals are extended and supplied as B', G', and R' signals to the color converting section 105.

Then in the color converting section 105, the B', G', R' signals supplied from the compressing/extending section 103 are converted Y, M, C signals. Further the YMC signals are processed in the ink block generating/ground removing section 106 to prepare a ink block and remove the ground, and are sent to the area separation type of filter 107. In the area separation type of filter 107, signals for an image comprising a plurality of pixels are grouped in to several blocks, and determination is made as to which of a pattern, background, and characters each block indicates, and also as to whether the block is a colored image or a monochrome image, and the blocks are synthesized to generate an area separation signal for an intermediate tome, a black character, or a colored character.

Further gamma correction and graduation processing are executed to the area separation signal generated by the area separating type of filter 107 in the gamma correcting section 108 and graduation processing section 109 and the first block is printed. Second and subsequent blocks are printed by extending the compressed data read out from the page memory 104 with the compressing/extending section 103 to B', G', and R' signals, sending the B', G', and R' signals to the color converting section 105, and executing the same processing as that described above. In this step, the YMC signals supplied to the area separation type of filter 107 are identical for all the blocks, so that the result of separation is also identical, so that the trouble as described above does not occur.

Further detailed description is made for the area separation type of filter 107 and compressing/extending section 103. In the area separation type of filter 107, a plurality of pixels are grouped in to several blocks and determination is made for each block to determine which of a pattern, background, and a character the block indicates, and an area separation signal for an intermediate tone, a black character, or a colored character is generated by synthesizing the blocks. In this step, runs of Y, M, and C signals each exceeding a specified value are counted for each pixel, and a run-length is measured for each block according to the value. As an inter-character space becomes longer as compared to the pitch of the dots in the character area while the block length becomes shorter, so that a character area can easily be separated from a meshed area. By employing the separating method as described above, determination is made as to whether an area is a black character area or not, and data for C. M, and Y block copies is reset.

In the compressing/extending section 103, the inputted. B, G, and R image signals are converted to color space signals Y, I, Q each for a brightness color difference ("brightness–color difference" spaces YIQ) by means of linear conversion. An example of the expression used for the conversion is as shown below:

$$Y = 0.30R + 0.59G + 0.11B$$

$$I = 0.74(R-Y) - 0.27(B-Y)$$

$$Q = 0.48(R-Y) + 0.41(B-Y)$$

By means of conversion to the "brightness–color difference" spaces YIQ as described above, a statistical power of the image is concentrated to the brightness signal Y with the entropy reduced. Namely the encoding efficiency is improved by reducing entropy.

Then the color space signals Y, I, Q each for a brightness color difference are subjected to sub-band conversion respectively. Examples of the simplest expression used for the conversion are shown below:

Low-pass filter $S(n) = |(x(2n) + x(2n+1))2|$

High-pass filter $D(n) = x(2n) + x(2n+1)$

Figure 3:
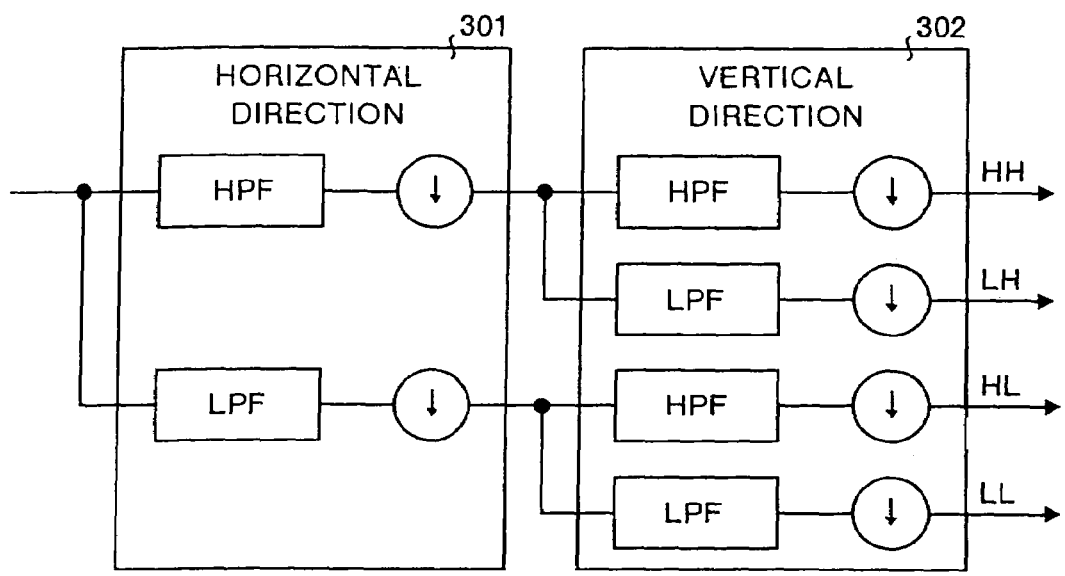
FIG. 3 is a block diagram showing an example of sub-band conversion in an embodiment of the present invention.

FIG. 3 is a block diagram showing an example of sub-band conversion in this embodiment. In this figure, the reference numeral 301 indicates a horizontal-directional filter consisting of a low-pass filter S (n) and a high-pass filter D (n) located as shown in the figure, and 302 indicates a vertical-directional filter consisting of low-pass filters S(n) and high-pass filters D (n) located as shown in the figure.

Figure 4A:
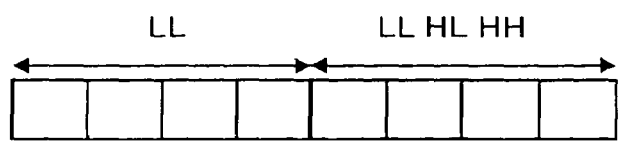
FIGS. 4A and 4B are explanatory views showing examples of quantization of a sub-band conversion coefficient in an embodiment of the present invention.
Figure 4B:
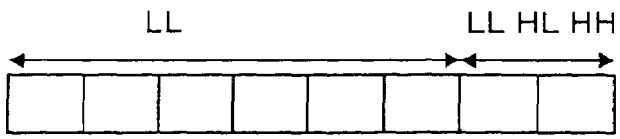

In FIG. 3, the original image is at first processed in the horizontal direction with the low-pass filter S(n) and high-pass filter D (n), and then processed in the vertical direction to generates 4 frequency band area signals for horizontally high area (HL), vertically high area (LH), diagonally high area (HH), and low area (LL). By recursively executing sub-band conversion to a low area coefficient in which the power is concentrated, the entropy can further be reduced to improve the encoding efficiency. Finally, the generated coefficient is quantized and stored in the page memory 104.

the conversion coefficient is quantized to a bit number fixed for each block. An example of quantization of the sub-band coefficient is shown in FIGS. 4A and 4B. In the example shown in FIGS. 4A and 4B, for 2×2 blocks of inputted 8 bit/pixel, the 8-bit conversion coefficient for low area (LL), 9-bit ones for horizontally high area (HL) and vertically high area (LH) and 10-bit ones for diagonally high area (HH) are converted to an 8-bit conversion coefficient (totally 36 bits) respectively. As fixed-length conversion is executed for each block herein, more efficient quantization can be executed by changing allocation of a bit number.

In a block in which an absolute value of a harmonic wave coefficient exceeds a specified value, as shown in FIG. 4A, bit allocation for the harmonic wave is increased, and in other blocks, bit allocation for a low-frequency wave is increased as shown in FIG. 4B.

When compressed data is extended, Y', I', and Q' signals are acquired by executing sub-band conversion using each quantization coefficient for reverse conversion to the B', G', and R' signals. It should be noted that, although the sub-band conversion or mutual conversion between BGR and YIQ can be executed in the reverse direction, but the compressing system in this embodiment can not be executed in the reverse direction in a process of quantizing a coefficient. If quantization is not executed, reverse conversion can be executed, but in that case an input 32-bit/block is converted to 36-bit/block so that there is no compression. Herein 32-bit/block is compressed to 8-bit/block, however if 32-bit/block is compressed to 6-bit/block, the compression ratio is high, but the quantization error becomes larger, which causes remarkable image degradation. Generally, when the compression ratio is raised, the image quality is degraded, and vice versa.

Thus, in this Embodiment 1 described above, processing with the area separation type of filter 107 is executed using the same signals (B', G', R') for all of the Y, M, C, and K blocks, and a different in a result of area separation is not generated for blocks, so that printing can be executed with high image quality.

Figure 2:
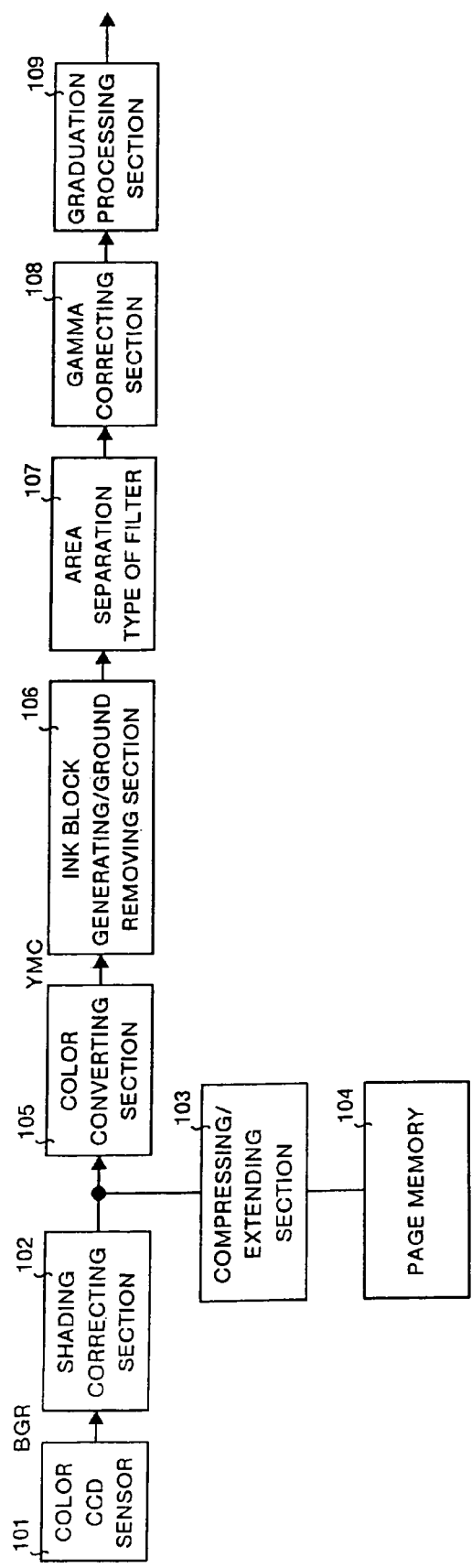
FIG. 2 is a block diagram showing system configuration of a color image processing apparatus according to Embodiment 2 of the present invention.

FIG. 2 is a block diagram showing system configuration of a color image processing apparatus according to Embodiment 2. This color image processing apparatus has the same components as those in the configuration shown in FIG. 1, but a portion of a flow of image signals therein is different. Namely, the image signal having been subjected to shading correction is supplied to the compressing/extending section 103 and to the color converting section 105 simultaneously. Accordingly the same reference numerals are assigned to the same components as those shown in FIG. 1 and description thereof is omitted herein.

Next, description is made for operations of the color image processing apparatus having the configuration as shown in FIG. 2. B,G, and R signals read with the color CCD line sensor 101 are at first sent to the shading connecting section 102 as described above. In this shading correcting section 102, image distortion due to non-uniformity in sensibility of the color CCD line sensor 101 as well as due to non-uniformity in the light from a light source in the document illuminating system is executed, and then the image signals are supplied to the compressing/extending section 103 as well as to the color converting section 105. In the compressing/extending section 103, the B,G, and R signals are successively compressed, and the compressed signals are stored in the page memory 104.

Concurrently with the processing described above, the color converting section 105 converts the B', G', and R' signals supplied from the shading correcting section 102 to Y,M,C signals. Further generation of a ink block and removal of ground are executed by the ink block generating/ground removing section 106 according to the Y, M, C signals to generate a K (black) signal, which is sent to the area separation type of filter 107. In the area separation type of filter 107, an image signal comprising a plurality of pixels is grouped in to several blocks, determination is made as to which of a pattern, background, and a character each block indicates, and also as to whether the block is colored or monochrome, and area separation signal for any of intermediate tone, a black character, or a colored character is generated by synthesizing the blocks.

Further, gamma correction and gradation processing are executed to the area separation signals generated by the area separation type of filter 107, and a K (black) block as a first block is printed. Then second and subsequent blocks are printed by acquiring Y,M,C, and K data from the page memory 104, extending the compressed data by the compressing/extending section 103 to B', G', and R' signals, sending the data to the color converting section 105, and executing the similar processing.

When non-reversible conversion is executed to all of Y, M, C, and K blocks in the compressing/extending section, influence over quality of a printed image in the K block copy is larger as compared to those in the Y, M, and C block copies. Therefore, in this Embodiment 2 a result of area separation can not be identical, but quality of the K block is not affected by the non-reversible conversion (to describe more strictly, not decoded to the original information), so that the compression ratio can be made higher as compared to that in Embodiment 1.

Namely, in Embodiment 2, a K (black) block having the largest influence over image quality is not degraded by compression or extending, so that printing can be executed with high image quality. Further, compressed data is used for Y, M, and C blocks which less effect on the image quality as compared to the black block copy, so that the compression efficiency can be made higher, and a required memory capacity can be reduced proportionately and cost reduction can be realized.

As described above, with the color image processing apparatus and color image processing method according to the present invention, processing is executed in the area separating section for all of the Y, M, C, and K blocks according to the same restored signals (B', G', and R') to prevent generation of non-uniformity in a result of area separation which can easily be generated due to a difference in the block. Therefore, an image-forming signal insuring excellent image quality is supplied to the image forming apparatus, so that it is possible to provide a color image processing apparatus having a low-cost and high speed page memory capable of suppressing image degradation.

With the color image processing apparatus and color image processing method according to the present invention, a black block which affects the image quality most is processed without compression or extending to prevent generation of degradation of image quality due to compression or extending, and additionally, restored signals after compression are used for the Y, M, and C blocks which affect the image quality least as compared to the K block copy to improve the compression ratio and reduce a required memory capacity proportionately, so that it becomes possible to provide a low cost color image processing apparatus.

With the color image processing apparatus and color image processing method according to the present invention, when the area separating unit generates an area separation signal, runs of Y,M, and C signals each exceeding a specified value are counted for each pixel, and run-length is measured for each block according to the count, so that a run-length becomes long in a meshed area and an inter-character space becomes longer as compared to a mesh point pitch in a character area with the block length becoming shorter, so that a character area can easily be separated from a meshed area.

With the color image processing apparatus and color image processing method according to the present invention, the compressing/extending unit converts BGR input signals to color-space signals Y, I, Q each for a brightness color difference for linear conversion, and then executes sub-band conversion, so that a statistical power for an image can be concentrated on the brightness signal Y and also entropy can be reduced.

With the color image processing apparatus and color image processing method according to the present invention, when compressed data is extended, sub-band reverse conversion is executed using each quantization coefficient to obtain Y', I', and Q' signals, and compressed data can be extended by converting the Y', I', and Q' signals to B',G', and R' signals by means of reverse conversion.

This application is based on Japanese patent application No. HEI 10-096145 filed in the Japanese Patent Office on Apr. 8, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed:

1. A color image processing apparatus for printing a color image by successively superimposing planes of four colors of Y (yellow), M (magenta), C (cyan), and K (black), the apparatus comprising:
   a compressing/extending unit configured to compress an image signal, thereby forming a compressed image signal, and configured to restore the compressed image signal and to output the restored image signal;
   a storage unit configured to store the compressed image signal;
   a color signal generating unit configured to generate four color plane signals for printing form the restored image signal; and
   an image forming unit configured to form a first plane from a K plane signal of the four color plane signals, and to form planes subsequent to a second plane from the compressed image signal stored in the storage unit.

2. The color image processing apparatus according to claim 1, wherein the compressing/extending unit is further configured to linearly convert the image signal to color space signals Y, I, and Q for brightness color difference and then to sub-band convert the Y, I, and Q signals.

3. The color image processing apparatus according to claim 1, wherein the compressing/extending unit is further configured to execute sub-band conversion to obtain Y', I', and Q' signals and to reversibly convert the Y', I', and Q' signals to B', G', and R' signals.

4. A color image processing apparatus for printing a color image by successively superimposing planes of four colors of Y (yellow), M (magenta), C (cyan), and K (black), the apparatus comprising:
   compressing/extending means for compressing an image signal, thereby forming a compressed image signal, and restoring the compressed image signal and outputting the restored image signal;
   storage means for storing the compressed image signal;
   color signal generating means for generating four color plane signals for printing from the restored image signal; and
   image forming means for forming a first plane from a K plane signal of the four color plane signals, and forming planes subsequent to a second plane form the compressed image signal stored in the storage unit.

5. The color image processing apparatus according to claim 4, wherein the compressing/extending means is further for linearly converting the image signal to color space signals Y, I, and Q for brightness color difference, and then sub-band converting the Y, I, and Q signals.

6. The color image processing apparatus according to claim 4, wherein the compressing/extending means is further for executing sub-band conversion to obtain Y', I', and Q' signals, and reversibly converting the Y', I', and Q' signals to B', G', and R' signals.

7. A color image processing method for printing a color image by successively superimposing planes of four colors of Y (yellow), M (magenta), C (cyan), and K (black), the method comprising:

compressing an image signal, thereby forming a compressed image signal;

storing the compressed image signal in a storage unit;

restoring the compressed image signal;

outputting the restored image signal;

generating four color plane signals for printing from the restored image signal; and forming a first plane from a K plane signal of the four color plane signals, and forming planes subsequent to a second plane from the compressed image signal stored.

8. The color image processing method according to claim 7, wherein the compressing includes linearly converting the image signal to color space signals Y, I, and Q for brightness color difference, and then sub-band converting the Y, I, and Q signals.

9. The color image processing method according to claim 7, wherein the compressing includes executing sub-band conversion to obtain Y', I', and Q' signals, and reversibly converting Y', I', and Q' signals to B', G', and R' signals.

* * * * *